(12) United States Patent
Tudhope et al.

(10) Patent No.: US 9,978,245 B2
(45) Date of Patent: May 22, 2018

(54) SYSTEMS FOR SENSING POOL OCCUPANTS AND REGULATING POOL FUNCTIONS

(71) Applicant: SAFEPOOL TECHNOLOGIES LLC, Tucson, AZ (US)

(72) Inventors: Andrew Tudhope, Tucson, AZ (US); Emilio Sardini, Brescia (IT); Marco Simoncelli, Bovezzo (IT)

(73) Assignee: SAFEPOOL TECHNOLOGIES, LLC, Tucson, AZ (US)

( * ) Notice: Subject to any disclaimer, the term of this patent is extended or adjusted under 35 U.S.C. 154(b) by 0 days. days.

(21) Appl. No.: 15/707,143

(22) Filed: Sep. 18, 2017

(65) Prior Publication Data

US 2018/0033281 A1    Feb. 1, 2018

Related U.S. Application Data

(63) Continuation-in-part of application No. PCT/US2016/022677, filed on Mar. 16, 2016.

(60) Provisional application No. 62/262,227, filed on Dec. 2, 2015, provisional application No. 62/134,539, filed on Mar. 17, 2015.

(51) Int. Cl.
*G08B 1/00* (2006.01)
*G08B 21/08* (2006.01)
*G01S 15/88* (2006.01)

(52) U.S. Cl.
CPC .............. *G08B 21/08* (2013.01); *G01S 15/88* (2013.01)

(58) Field of Classification Search
CPC ................................ G08B 21/08; G01S 15/88

USPC ........ 340/506, 539.1, 539.11, 539.13, 573.1, 340/573.6
See application file for complete search history.

(56) References Cited

U.S. PATENT DOCUMENTS

| 4,139,834 | A | 2/1979 | Matsui et al. |
| 4,995,397 | A | 2/1991 | Nishiyama et al. |
| 5,195,060 | A | 3/1993 | Roll |
| 5,907,281 | A | 5/1999 | Miller, Jr. et al. |
| 6,980,109 | B2 | 12/2005 | Hoenig |
| 7,330,123 | B1 | 2/2008 | Grahn et al. |
| 7,724,133 | B2 | 5/2010 | Laitta et al. |
| 8,237,574 | B2 | 8/2012 | Anderson et al. |
| 8,669,876 | B2 | 3/2014 | Anderson et al. |
| 2001/0048365 | A1 | 12/2001 | McFarand |

(Continued)

FOREIGN PATENT DOCUMENTS

| DE | 19860666 A1 | 6/1999 |
| EP | 1624427 A1 | 2/2006 |

(Continued)

*Primary Examiner* — Daryl Pope

(57) ABSTRACT

An ultrasonic pool occupant sensing device capable of using ultrasonic pulses to analyze the occupancy level of a swimming pool. An ultrasonic transducer sends and receives ultrasonic pulses. A front end electronics has a driver for controlling the transducer, a pre-amplifier, band-pass filter, and amplifier combination for filtering received signals. The digital processing unit contains a timer unit for generating pulses, an AD converter for digitizing received pulses, a signal processor for determining data about the return pulse, and an I/O unit for transmitting data to the central processing unit. The data may be an estimate of the number of people in the sensor range, or it may be data about the return pulse that can be analyzed by the central processing unit.

19 Claims, 11 Drawing Sheets

(56) References Cited

U.S. PATENT DOCUMENTS

| | | |
|---|---|---|
| 2005/0030929 A1 | 2/2005 | Swier, Jr. et al. |
| 2007/0200715 A1 | 8/2007 | Durand |
| 2009/0027211 A1 | 1/2009 | Cutler et al. |
| 2009/0064403 A1 | 3/2009 | Wolfe |
| 2009/0303055 A1 | 12/2009 | Anderson et al. |
| 2014/0049394 A1 | 2/2014 | Snyder et al. |
| 2014/0278229 A1* | 9/2014 | Hong .................... A63B 71/06 702/160 |

FOREIGN PATENT DOCUMENTS

| | | |
|---|---|---|
| EP | 2466562 A1 | 6/2012 |
| WO | WO9512135 A1 | 5/1995 |
| WO | WO0058753 A1 | 3/2000 |
| WO | WO2007060378 A1 | 5/2007 |
| WO | WO2016149392 A1 | 9/2016 |

\* cited by examiner

SYSTEMS FOR SENSING POOL OCCUPANTS AND REGULATING POOL FUNCTIONS

CROSS REFERENCE

This application is a continuation-in-part and claims benefit of PCT/US16/22677 filed on Mar. 16, 2016, which claims benefit of U.S. Provisional Patent Application No. 62/134,539, filed Mar. 17, 2015 and U.S. Provisional Patent Application No. 621262,227, filed Dec. 2, 2015, the specifications of which are incorporated herein in their entirety by reference.

FIELD OF THE INVENTION

The present invention relates to improvements to pool water systems, more specifically, the present invention relates to regulation of pool water cleaning systems and occupancy of pools.

BACKGROUND OF THE INVENTION

It is well known that in a swimming pool, it is necessary to keep water "clean" by maintaining a good water circulation level and using the correct levels of additives, i.e., feed or chemical products (e.g., chlorine, muriatic acid, or similar). The needed water flow and chemical quantity depend on various factors, but one of the most important that can vary easily is the number of persons inside the swimming pool (especially in large swimming pools or public swimming pools). There are systems that can measure the level of chemistry inside the water, such as indicating when more products are required if the level is not ideal, but the consumption of these products depends also on the water flow circulating inside the pool. The circulation is created by a specific pump system controlled by a dedicated device. In the simplest cases, the device is a timer, and for bigger pools and public pools, it could be a programmable logic controller ("PLC").

Normally, the circulation is set without considering the number of persons that are inside the pool. The circulation can be set by systems that switch on and off pumps within a specific period of time, for example, "n" minutes on and "m" minutes off (where "n" and "m" are variable numbers). This configuration could work in private small swimming pools, where the variation of the crowd level is not as important. Moreover, these pools cannot accommodate more than a few people and normally are not used extensively. In bigger pools, especially in public pools, the conditions are different. During the day, the crowd level of the pool can vary significantly. Because the most important requirement is to keep the water clean, in the previous and common configurations, the pumps would run even when nobody is inside the pool; resulting in a waste of energy (over use of the pumps) and additives (due to unnecessary water flow).

There are other systems that can control the number of people accessing the pool area, for example, by using turnstiles and toll gates at the entrance of the building. In these cases, the pumps' speed and the chemistry are regulated by a PLC basing on that number. Even if this is a "greener" configuration as compared to the first one, these systems cannot know how many people are actually inside the pool. For instance, many of them could be in the building or in the area around the pool but not inside the water, e.g., in a water park or similar locations. This limitation can be a source of wasted energy and additives.

The purpose of the system described herein is for monitoring the status of a swimming pool and understanding the level of crowding inside the swimming pool. The system may transmit data to the circulation control system of the swimming pool to regulate, for example, the pump speed and the additive concentration based on effective need.

SUMMARY OF THE INVENTION

The system described in this patent is constituted of one or a series of devices that create a kind of matrix for the specific swimming pool: from the interaction between those devices a central control unit can understand the status of the various "cells" constituting the pool area and, in general, the crowd level of the swimming pool at that moment.

The core technology of each device is the analysis of the output signal as measured by the receiving transducer. This signal contains the echoes of ultrasonic waves generated by appropriated ultrasonic transducers inside the swimming pool; the same transducers can work as transmitter and receiver. The signal is processed by a front end electronics system and the output is analyzed by a digital processing unit.

According to one embodiment, the present invention features an ultrasonic pool occupant sensing device, capable of using ultrasonic pulses to analyze an occupancy level of a pool. The device may comprise an ultrasonic transducer, capable of sending and receiving ultrasonic pulses, wherein the transducer emits an ultrasonic pulse when activated by an electronic pulse, wherein the transducer generates an electronic signal when it receives an ultrasonic signal; a front end electronics system operatively connected to the ultrasonic transducer capable of processing incoming and outgoing electronic signals from the transducer; and a digital processing unit.

In some embodiments, the front end electronics system may comprise a driver capable of sending an electronic pulse to the transducer; a low-noise pre-amplifier, capable of receiving an electronic signal from the transducer; a band-pass filter, operatively connected to the pre-amplifier, capable of filtering the electronic signal from the transducer; and an amplifier, operatively connected to the band-pass filter, capable of amplifying the electronic signal receiver from the band-pass filter.

In other embodiments, the digital processing unit may comprise a timer unit, configured to signal the driver to generate the electronic pulse at intervals; an input/output unit, capable of sending and receiving data to and from the front end electronics system and the digital processing unit; an analog-to-digital converter, configured to convert the electronic signal received from the transducer from analog-to-digital; and a signal processor, configured to analyze the electronic signal and produce data concerning a number of occupants in the pool.

In one embodiment, the pool occupant sensing device is placed inside the pool. The timer unit of the digital processing unit sends a timing signal to the driver of the front end electronics system, whereupon the driver generates an electronic pulse. The pulse is then transmitted to the ultrasonic transducer. The ultrasonic transducer emits an ultrasonic pulse which is transmitted into the pool at intervals, for example, regular or irregular intervals etc. The ultrasonic pulse is reflected off of the walls and occupants within the pool. The transducer receives a signal that depends also on the echoes due to the various occupants and walls of the pool. The transducer generates a received electronic signal, which is passed through the pre-amplifier, band-pass filter, and amplifier of the front end electronics system. The received signal is acquired by the analog-to-digital converter of the digital processing unit, which passes the digital signal to the signal processor. The signal processor generates data concerning the number of occupants in the pool, and the input/output unit permits the data to be transmitted to the central unit or to an external processor.

In another embodiment, the signal processor compares data derived from the ultrasonic pulse transmitted into the pool at intervals, for example regular or irregular intervals etc., to determine a change in the occupancy level. In a further embodiment, the external processor is operatively connected to a visual display unit to display the number of occupants and/or the position of occupants in the pool.

According to another embodiment, the present invention features a pool occupancy level system comprising at least one of the ultrasonic pool occupant sensing devices described herein. The external processor can collect data from each pool occupant sensing device, and generate an aggregate estimate of the total number of occupants in the pool. For example, the system may comprise a plurality of pool occupant sensing devices, wherein the pool occupant sensing devices communicate data and commands between them exploiting ultrasonic waves travelling into water.

In still other embodiments, the present invention may feature a pool water regulation system based on sonar detection of a number of occupants in a pool. The system may comprise a central processing unit, at least one ultrasonic pool occupant sensing device described herein, operatively connected to the central processing unit and disposed inside a pool, and a pool water circulation control system, capable of adjusting the rate at which water is pumped through the pool and the amount of additives added, operatively connected to the central processing unit.

The central processing unit can collect data from each ultrasonic pool occupant sensing device, and generate an aggregate estimate of the total number of occupants in the pool. The central processing unit controls the pool water circulation system to adjust the additive dispensation and pump rate of the circulation system according to the number of occupants in the pool. In some embodiments, the pool occupant sensing devices are arranged to form a grid across the pool. The central processing unit can determine how many occupants are in each section of the grid, and the pool circulation in each grid section is independently controlled. In other embodiments, the pool occupant sensing devices communicate data and commands between them by exploiting ultrasound waves travelling into water. In one embodiment, the additives comprise cleaning chemicals or solutions. In another embodiment, the additives comprise feed.

In a further embodiment, the present invention may feature an ultrasonic pool occupant sensing device, capable of using ultrasonic pulses to analyze an intrusion in a pool. The device may comprise an ultrasonic transducer capable of sending and receiving ultrasonic pulses, a front end electronics system operatively connected to the ultrasonic transducer, and a digital processing unit. The ultrasonic transducer can emit an ultrasonic pulse when activated by an electronic pulse, and can generate an electronic signal when it receives an ultrasonic signal.

In one embodiment of the present invention, the front end electronics system may comprise: a driver capable of sending an electronic pulse to a transducer; a low-noise pre-amplifier, capable of receiving an electronic signal from the transducer; a band-pass filter, operatively connected to a pre-amplifier, capable of filtering the electronic signal from the transducer; and an amplifier, operatively connected to the band-pass filter, capable of amplifying the electronic signal receiver from the band-pass filter.

In another embodiment of the present invention, there is provided a digital processing unit comprising a timer unit, configured to command a driver to generate an electronic pulse, an input/output unit, capable of sending and receiving data to and from the front-end electronics system and the processing system, an analog-to-digital converter, configured to convert the electronic signal received from the transducer from analog-to-digital, and a signal processor, configured to analyze the received digital signal and produce data concerning a number of occupants in the pool.

The pool occupant sensing device may be placed inside the pool, and the timer unit of the digital processing unit sends a timing signal to the driver of the front end electronics system at intervals, for example, regular or irregular intervals etc. The driver generates an electronic pulse, which is transmitted to the ultrasonic transducer. The ultrasonic transducer emits an ultrasonic pulse which is transmitted into the pool.

In one embodiment, the ultrasonic pulse is reflected off the walls and an intrusion within the pool. The transducer receives a signal that depends also on the echoes due to the intrusion and walls of the pool. The transducer generates a received electronic signal, which is passed through the pre-amplifier, band-pass filter, and amplifier in the front end electronics system. The received signal is transmitted to the digital processing unit that passes the signal through the analog-to-digital converter to produce a digital signal of the pulse. The signal processor generates data concerning the presence of the intrusion in the pool, and the input/output unit permits the data to be transmitted to an alarm system.

In some embodiments, the signal processor compares data derived from the ultrasonic pulse transmitted into the pool at intervals, for example, regular or irregular intervals etc. to determine an intrusion in the pool. The data can be transmitted to a visual display unit to display the aggregate estimate the position of the intrusion in the pool. In other embodiments, the alarm system is a remotely located alarm system. The data can be transmitted to the remotely located alarm system wirelessly.

According to further embodiments, the present invention features a pool intrusion system comprising one or more of the ultrasonic pool occupant sensing devices described herein. In one embodiment, the pool occupant sensing devices can communicate data and commands between them wirelessly. In another embodiment, the pool occupant sensing devices communicate data and commands between them, exploiting ultrasound waves travelling into water. Advantageously, coded ultrasonic signals may be used between a series of ultrasonic pool occupant sensing devices to synchronize operations of the overall system or to exchange data.

Various pool devices implementing ultrasonic pulses have been proposed and are the subject of prior patents. For instance, Wolfe (US 2009/006443) discloses a suction drain entrapment prevention system for users of a swimming pool. A transducer assembly converts received electronic pulses into ultrasonic pulses to be radiated from within a suction drain, through the cover of said drain, and into the water of the pool. Echoes of the ultrasonic pulses are received by the transducer and processed to determine if the swimmer nearest to the suction drain is within an "OK range gate" or within a "NO-GO range gate." Whereas the objective of Wolfe's system is simply to detect the presence of a swimmer within a given distance of the suction drain, the present invention is effective for determining an occupancy level (i.e., the number of swimmers) of the swimming pool. As may be understood by one of ordinary skill in the art, detecting a swimmer in a swimming pool in the presence of multiple swimmers cannot be interpreted as determining a count of swimmers in said pool. This is well understood as determination of a count of objects is a higher-level processing/analysis feature compared to simple object detection. As such, a proper pre-processing and processing of the received signal is necessary to extract this information. For instance, in some embodiments, the present invention comprises: (1) a front end electronics system comprising a low noise pre-amplifier, a band-pass filter, and an amplifier for processing the return signal before analysis and (2) a digital processing unit comprising a timer unit, an analog-to-digital converter, and a signal processor. The signal processor analyzes the pre-processed/processed received signal to derive a plurality of quantities and to evaluate the plurality of quantities to determine an estimate of the number of occupants in the pool. Wolfe's invention does not include any of the aforementioned components and is thus unable to determine the occupancy level.

Further still, Wolfe discloses an arrangement configured to differentiate a swimmer from a non-swimmer. In one embodiment, Wolfe appears to disclose a system that tracks a person (referring to Wolfe's FIGS. 1B-1D, 14A, 14B and paragraph [0241]). This arrangement requires the system to compare a reference signal with the new signal. However, using such an approach can be disadvantageous due to variabilities, such as the speed of the swimmer and the depth of the pool. Referring to FIG. 14, if the person is swimming slowly, there is little to distinguish the swimmer from the non-swimmer. This can lead to false alarm or incorrect detection. Moreover, the arrangement of Wolfe appears to be arranged to detect proximity. While such practice is used in PIR sensors, this may not be the best approach in detecting a non-swimmer, as detection is dependent on the dimension of the pool and can cause blind spots or non-detection zones for non-swimmers (see FIG. 15). In addition, a non-swimmer does not necessary fall in the direct path of the sensor, i.e., in this case the drain cover. Non-swimmers tend to fall near the perimeter of the pool. In the case of using a proximity approach as described by Wolfe, this may not be sufficient to detect a non-swimmer. While Wolfe states that his arrangement may be used to detect a sudden change in the pool, i.e., a person falling in (paragraph [0239]), it appears that this arrangement may not be adequate for detecting a falling person due to the application of the proximity detection.

Matsui (U.S. Pat. No. 4,139,834) discloses an ultrasonic wave transmitter/receiver and features an amplifier operatively coupled to a band-pass filter for processing the signal received by the transducer. Swier (US2005/0030929) teaches a low-noise pre-amplifier capable of receiving a wireless local area network ("LAN") radio frequency ("RF") signal for amplifying said signal while injecting little noise. Wolfe, Matsui, and Swier cannot be combined to arrive at the combination/order of elements of the present invention as claimed. For example, the order of elements disclosed by Matsui feature a signal received by the transducer encountering a load resistor and a coupling capacitor prior to amplification (via the amplifier) and subsequent filtering (via the bandpass filter). This is a reverse of the present invention, as the received signal is first filtered and then amplified. Moreover, a load resistor and coupling capacitor are not required by the present invention.

Additionally, there is no motivation to combine Wolfe, Matsui, and Swier because, although the combination would provide a processed signal, said signal would be superfluous as the objective of Wolfe is simple object detection. It is also to be noted that Swier is non-analogous art as it belongs to the field of wireless LAN access point(s) detection and wireless RF devices. Furthermore, no combination of Wolfe, Matsui, and Swier provides a signal processor capable of deriving and evaluating a plurality of quantities from the received signal to determine an estimate of the number of occupants in the pool.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DETAILED DESCRIPTION OF THE INVENTION

Figure 1:
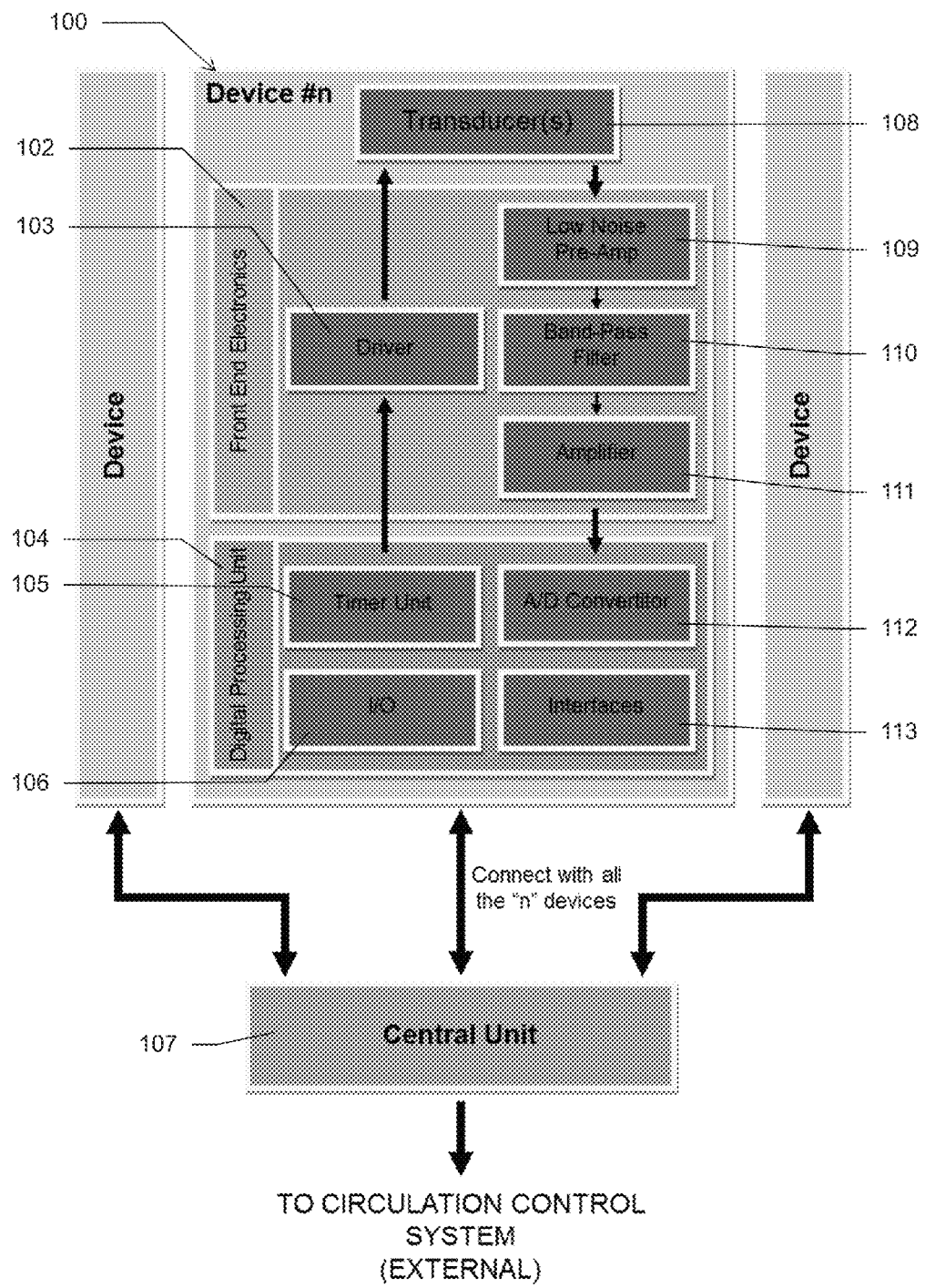
FIG. 1 shows an exemplary schematic diagram of the ultrasonic sensing device of the invention.

In the following description, functionally similar parts carry the same reference numerals between different embodiments. The drawings are intended to be schematic, and dimensions, scale and/or angles may not be determined accurately from them unless otherwise stated.

Within the statement of invention, description and claims, unless otherwise stated, the terms occupants, people and objects are intended to have equivalent meaning, i.e., bodies, foreign bodies or contaminants that are not permanent fittings, fixtures or structures of the pool, but it does not necessarily imply whether the occupants are static or dynamic objects.

Within the statement of invention, description and claims, unless otherwise stated, the terms pool and swimming pool are intended to have equivalent meaning, i.e. an enclosure, chamber, vessel or storage container suitable for containing fluids or water, but it does not necessarily imply that the enclosure, chamber, vessel or storage container is exclusively for human use.

Within the statement of invention, description and claims, unless otherwise stated, the terms chemical products, solution, feed etc. are intended to have equivalent meaning, i.e. additives or supplementary products to be dosed into the pool.

Within the statement of invention, description and claims, unless otherwise stated, the terms signal(s), data, pulse(s) etc. are intended to have equivalent meaning, i.e. transmission of information.

Within the statement of invention, description and claims, unless otherwise stated, the term actual signal means live or real-time signal, i.e. the most recent or newly acquired signal with respect to time, but it does not necessarily imply that the signal is limited to a specific signal bandwidth/range, frequency range, background noise and/or interference.

Within the statement of invention, description and claims, unless otherwise stated, the terms water and liquid are intended to have equivalent meaning, i.e. a body of fluid.

Within the statement of invention, description and claims, unless otherwise stated, the term interval includes regular, irregular and random intervals, but does not necessary imply that its frequency or cycle is a defined by an integer, value, formula or equation.

Within the statement of invention, description and claims, unless otherwise stated, the terms unit and system are intended to have equivalent meaning, i.e. an apparatus with an intended purpose, but it does not necessarily imply that the apparatus is a discrete device or an arrangement having a series of discrete devices.

Referring now to FIGS. 1-4, in a first embodiment, the system of the present invention comprises a pool sensing system based on ultrasonic frequencies (i.e., between 20 kHz to 300 MHz, but preferably between 20kHz to 1 MHz) for detecting the occupancy level (i.e., the number of people) of a swimming pool. Higher frequencies may be used in other applications to detect smaller objects such as krill. The system comprises a central processing unit (107) operatively connected to one or more ultrasonic pool occupant sensing devices (100), which are disposed inside the swimming pool.

In another embodiment, the pool sensing system may be used as a water regulation system, which may further comprise a pool water circulation control system. In an embodiment, the pool water circulation control system is capable of adjusting the rate at which water is pumped through the pool and the amount of cleaning chemicals added based on the occupancy level of the swimming pool. In this embodiment, the pool water circulation may be operatively connected to the central processing unit. The central processing unit (107) may collect data from each pool occupancy sensing device (100) and generate an aggregate evaluation of the total number of occupants in the pool.

The architecture of the system of the present invention described above can be implemented into a single discrete unit, while maintaining the essential function. For example, said single discrete unit may contain the central processing unit (107) and one pool occupancy sensing device (100). In the case where a secondary pool occupancy sensing device (100) is required, the secondary pool occupancy sensing device may communicate with the discrete unit. Moreover, the central processing unit (107) may, in some cases, control the pool water circulation control system by directly controlling the chemical dispensation and/or flow rate of the circulation system according to the occupancy level.

As shown in FIG. 1, in some embodiments, each pool occupancy sensing device (100) contains an ultrasonic transducer (108), a front end electronics system (102), and a digital processing unit (104). The ultrasonic transducer (108) is capable of sending and receiving ultrasonic pulses. The transducer (108) may emit an ultrasonic pulse, when activated by an electronic pulse, and generate an electronic signal containing echoes resulting from the ultrasonic waves. The front end electronics system (102) is operatively connected to the ultrasonic transducer (108) comprising: a driver (103) that controls the transmitting function of the transducer, capable of sending said electronic signal to the transducer, at least one a low-noise pre-amplifier (109), a band-pass filter (110), and an amplifier (111), which filters and amplifies the electronic signal received from the transducer (108).

In other embodiments, the pool occupancy sensing device (100) may further comprise a digital processing unit (104) that comprises: a timer unit (105), configured to command the driver to generate an electronic pulse; an input/output unit (106), capable of sending and receiving signals between the front-end electronics unit and the central processing unit (107); an analog-to-digital converter (112), configured to digitize a signal received from the transducer; and a signal processor (113) for analyzing and producing data about the received signal. The data may be an estimate of the number of people in the sensing range of the transducer, or it may be data about the return pulse that can be analyzed by the central processing unit (107).

In a typical embodiment, each pool occupant sensing device is placed inside a swimming pool, wherein the timer unit of the digital processing unit sends a pulse to the driver of the front end electronics system at intervals, for example, regular or irregular intervals etc. The driver generates an electronic pulse, which is transmitted to the ultrasonic transducer, whereupon the ultrasonic transducer emits an ultrasonic pulse which is transmitted into the swimming pool. An echo(es) is generated by the ultrasonic pulse reflecting off the walls of the swimming pool and off the occupants within the swimming pool.

The transducer also works as a receiver and generates an electronic signal derived from said echo, whereby the echo depends on different distances at which the echo has to travel when reflecting off the various occupants and walls of the pool. The electronic signal is passed through the pre-amplifier, band-pass filter, and amplifier before going to the analog-to-digital converter of the digital processing unit. The digital processing unit elaborates the digital signal keeping into consideration both its energy (a square function of the signal) and its morphology and generates data concerning the number of occupants in the pool. The input/output unit permits this data to be transmitted to the central processing unit, which may be externally located.

As described before, the system is constituted by a series of devices, each of them works for a certain area of the swimming pool that could be just a part or the total, controlling it based on the received signals due to the ultrasonic waves and their analysis. Each device can communicate data and commands between them by exploiting the ultrasonic waves: they can use coded ultrasonic signals in order to synchronize operations of the overall system or to exchange data. Any object inside the volume of water (including walls and people) reflects (totally or partially) the ultrasonic waves (generated by the transducers) creating echoes; when these echoes come back to one of the transducers, they change the output signal generated at the edges of it (because of the water pressure and the nature of piezoelectric material inside the transducer).

The acquisition of the voltage signals is obtained in the following way:
 a. driving of a transmitter (the ultrasonic transducer of that device) through a pulsed signal to generate a train of ultrasonic waves in the water volume of the swimming pool;
 b. acquisition of the voltage signals measured by the ultrasonic waves arrived to the receiving transducer and coming from the rebound of ultrasonic waves on the walls and/or any possible objects and persons contained in the volume of water of the pool; those ultrasonic waves could be generated by the device itself and/or by another transducer/source of ultrasonic waves).

The digital processing unit analyzes the digital signal according to an algorithm to extract desired information about the level of occupancy of the swimming pool or its specific area. The algorithm may evaluate:
 1. time of flight of the different echoes due to various objects/people inside the pool: calculating the time between the generated waves and the various echoes peaks—with this data it may be possible to estimate, for example, the distance between the transducer and the objects;
 2. change of energy of the signals measured by the transducer and morphology of the digital signal with respect to those of a reference signal; the energy and morphology of the digital signal changes, for example, due to the people inside the pool (because of the nature of living tissues and air presence inside the body) and any background or unwanted signals;
 3. a comparison on morphology with respect to a reference echo signal: various algorithms to evaluate how different the actual signals could be with respect to the reference echo signal (that could be, for example, the echo signal of an area of the pool when the pool is empty or when it is considered at maximum capacity).

The reference signal is a digital signal that contains any data produced by the structural characteristics of an empty swimming pool together with any background or noisy signals due to any undesired effects such as, for example, temperature changing, raining or wind presence, water turbulence, evaporation due to the sun etc. The reference signal is continuously updated keeping into consideration the variations of the quantities that produce the undesired effects.

In some embodiments, each device sends the digital signal or its elaboration to a central unit. This central unit communicates with all the devices and determines the status of the various areas (or "cells" of the matrix) of the swimming pool; using this information, the central unit can send to the water circulation system of the swimming pool (considered external to the present system) the instructions to use water flow and chemistry based on effective need.

In some embodiments, the physical system comprises a central processing unit, one or more devices, each one with ultrasonic transducer(s), a front end electronics system, and a digital processing unit. The central unit is responsible for managing, coordinating and communicating with all the devices; moreover, it communicates instructions to the external water circulation system of the swimming pool. The ultrasonic transducers are responsible for the generation and the detection of the ultrasonic waves. The front end electronics system is responsible for the driving signal of the ultrasonic transmitter and the acquisition of the voltage signals coming from all the transducers (working as receivers). The digital processing unit contains the algorithm that implements the elaborating technique previously described. The communication between the various devices and the central unit, as well as the communication between the central unit and the external systems could be via cable, wireless, or by ultrasonic waves (any method/technology to communicate between devices could be used). The power for all the system could be supplied using any suitable method(s) (e.g., batteries, solar, super capacitor(s), proper transformers connected with the local electrical power supply, etc.).

In some embodiments, the mode of operation of the transducer may alternate between a "shooting time" and an "acquisition time", wherein the timer is configured to send a pulse during the shooting time, at which time the transducer is in a transmission mode. The transducer is then switched into a receiving mode for a length of time necessary to capture the echoes. In some embodiments, the control unit may be programmed with a stored reference signal, which is recorded when the pool is empty. The reference signal is used for comparison to the return signal in estimating the number of people in the pool.

The reference signal can be updated or replaced with a new reference signal, for example, if there has been a physical or geometric change in the pool such as a newly installed structure or ladder, or the removal of an existing structure or ladder, and/or a variation in the physical and/or chemical characteristics of the water inside the pool, such as a change in the water temperature. This allows the sensing device (100) to have a more accurate comparison of data.

Advantageously, upon sending, receiving and converting data at intervals, for example regular or irregular intervals etc., concerning the number of occupants in the pool, the control unit can detect a change in occupancy level by comparing newly acquired signals against a previous signal.

Figure 2:
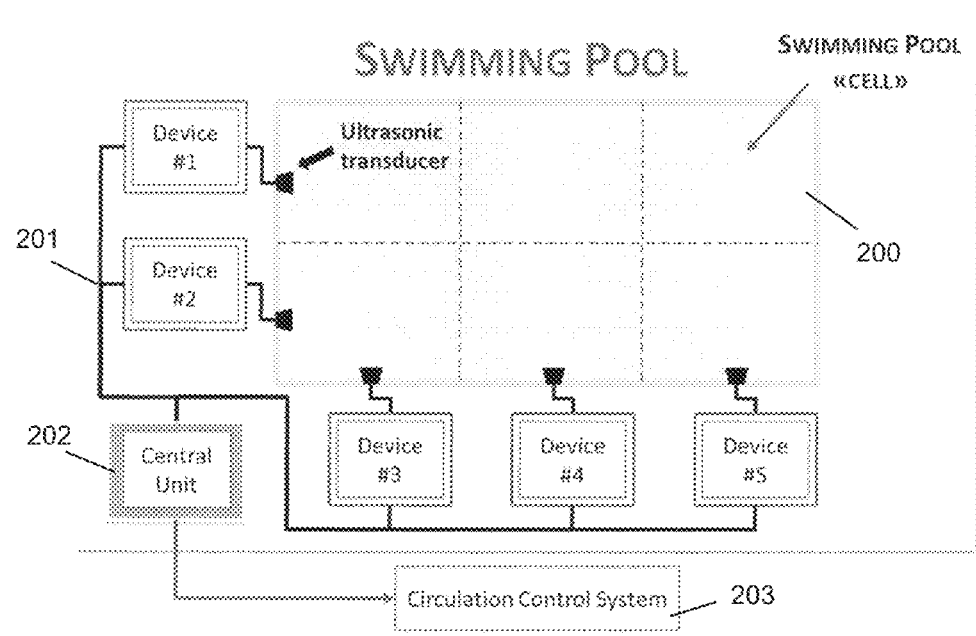
FIG. 2 shows a possible example configuration of the system of the invention using five devices within a swimming pool.

As shown in FIG. 2, the devices (201) may be arranged around the sides of the pool (200) so as to form a network or grid. In this way, the central unit (202) can evaluate the number of people in each section of the grid based on the shape of the return pulse, such as the timing of reflections indicating distance from the transducer of each device (201). The estimate is then used to adjust the circulation control system (203).

Figure 3:
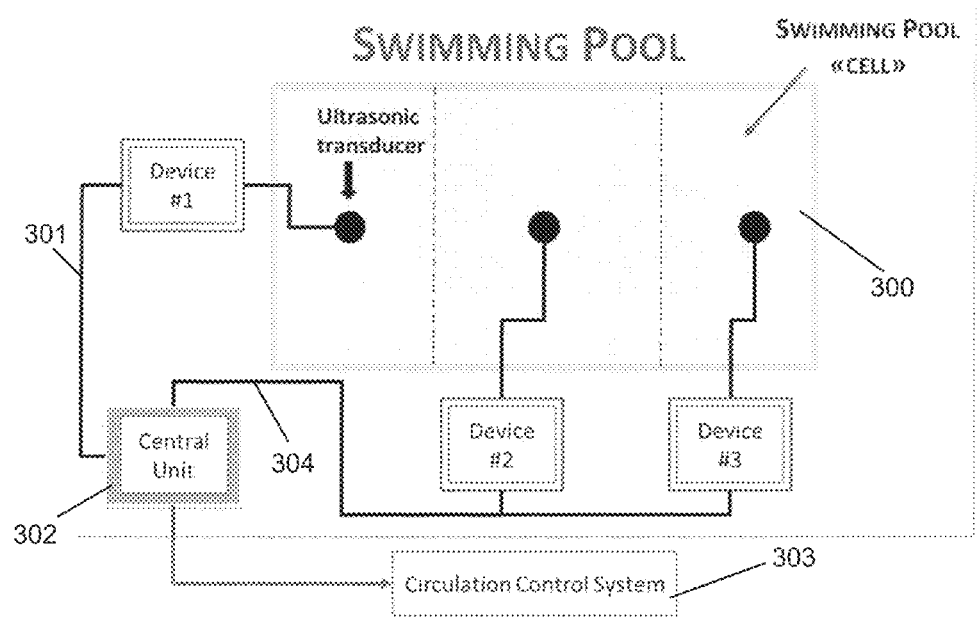
FIG. 3 shows a second possible example configuration of the system of the invention using three devices within a swimming pool.

As shown in FIG. 3 the devices (301) may be arranged on the bottom of the pool (300), with one device per section. In this way the devices may each generate an evaluation of the number of people in each section. A central processing unit (302) then combines the evaluations and uses the numbers to adjust the circulation control system (303).

Figure 4:
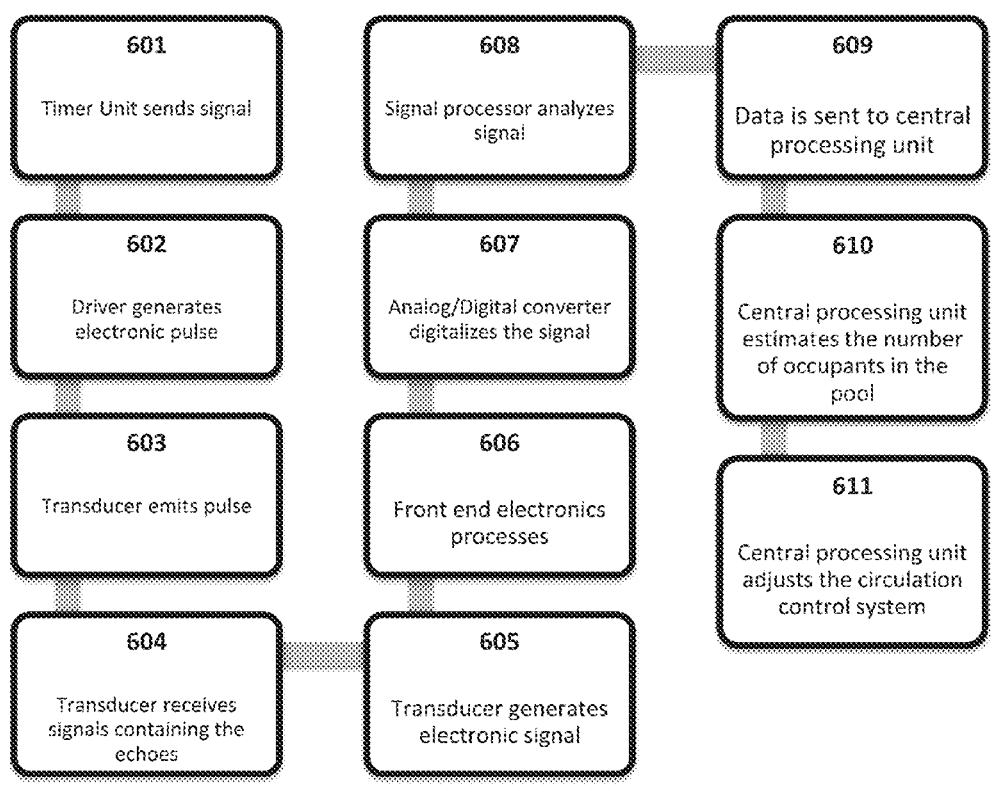
FIG. 4 shows an example process flow for the system of the present invention.

FIG. 4 shows an example process flow for the system of the present invention. The timer unit generates pulses (601). The frequencies of the pulses are sized to permit the return pulse to echo from the far wall of the pool and be received by the transducer. The driver generates an electrical signal intended to drive the ultrasonic transducer (602). This signal is then sent to the ultrasonic transducer and causes the transducer to emit an ultrasonic pulse (603). The pulse echoes off the walls and people in the pool and is reflected back to the transducer. The transducer is switched into the receiving mode (604), and receives the echoes when they come back. The transducer generates, as its output, an electronic signal (605) that is passed through a filter in the front-end electronics (606), and is converted into a digital form with respect to time in the digital processing unit (607). The signal processor analyzes the digital signal (by comparing it to the reference signal), updates the reference signal, and computes data (608), which is then sent to the central processing unit (609). The central processing unit then estimates the aggregate number of occupants in the pool (610) and uses this estimate adjust the circulation control system (611) so as to optimize the dispensation of cleaning chemicals.

Figure 5:
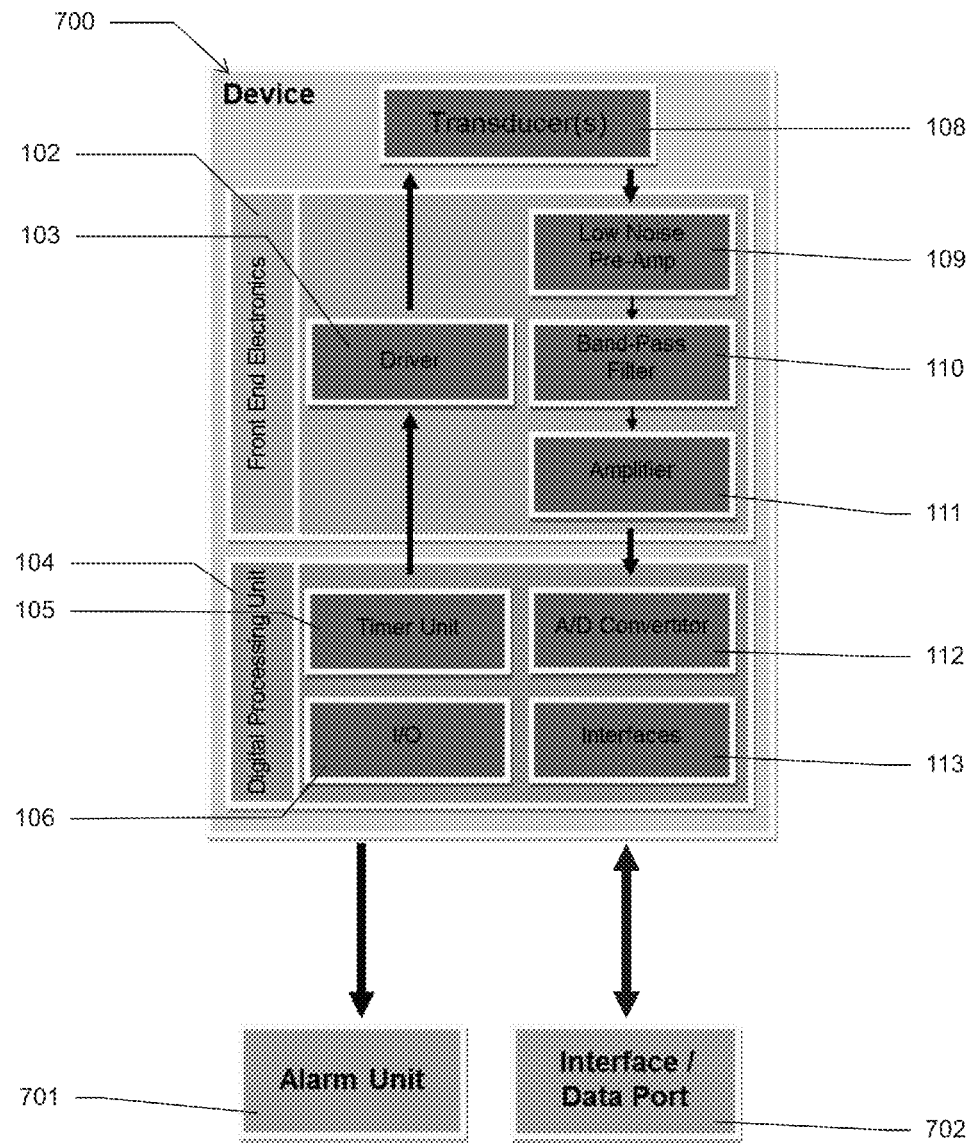
FIG. 5 shows a schematic diagram of the ultrasonic sensing device according to a second embodiment of the invention.

FIG. 5 shows a schematic diagram of the ultrasonic sensing device (700) that may be used to detect an intrusion in the pool, for example, a child or animal falling into the pool. The intrusion into the swimming pool is detected as a change in the occupancy level, i.e., abnormalities or deviations from the reference signal. In this embodiment, the sensing device (700) contains identical components as the first embodiment of the ultrasonic sensing device (100), where the similar components will use the same reference numerals. As described above, the device (700) comprises an ultrasonic transducer (108), a front end electronics system (102), and a digital processing unit (104). Unless otherwise stated, it is not intended to further describe the operation, features and function of the similar components to avoid duplication.

Figure 6:
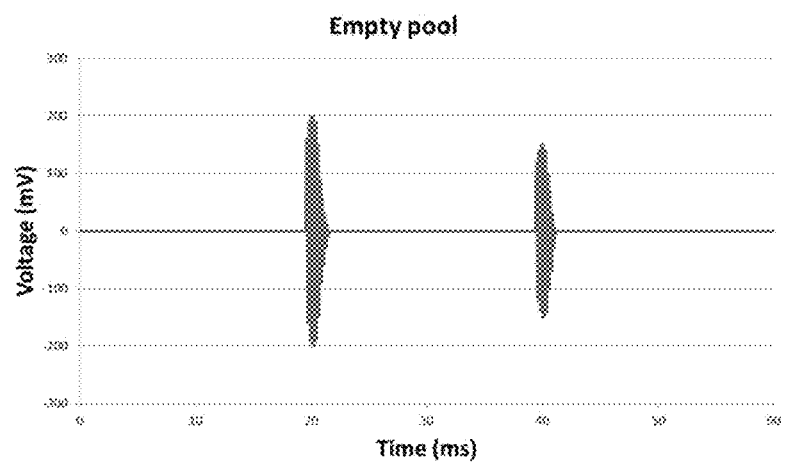
FIG. 6 shows an example of a return signal from the ultrasonic transducer mounted in an empty pool.
Figure 7:
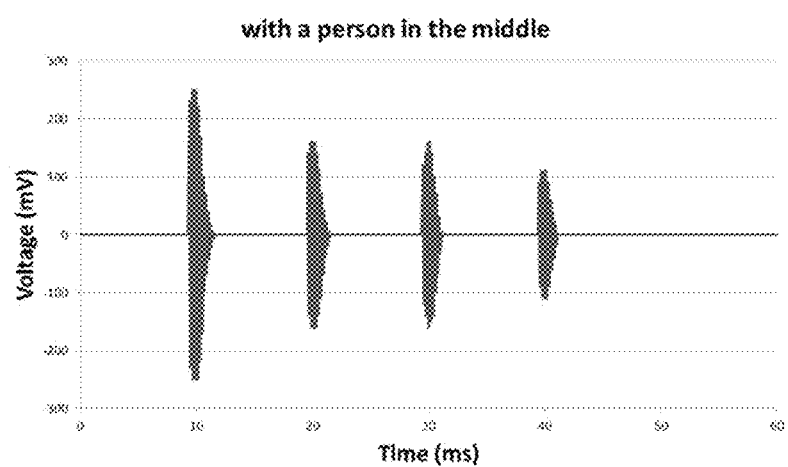
FIG. 7 shows an example of a return signal from the ultrasonic transducer mounted in the same pool with a person in the middle.

FIG. 6 shows an example of a signal generated by the transducer (108) when nobody is in the pool or when the level occupancy of the swimming pool is zero. FIG. 7 shows for comparison an example of a signal when there is an occupant in middle of the pool. The signal of FIG. 7 is a modification of the signal of FIG. 6 and indicates the presence of a person halfway across the pool.

In a second embodiment, the mode of operation of the transducer may be alternated between a "shooting time" and an "acquisition time", as described above where the transducer sends the pulse during the shooting time in the transmission mode. The transducer is then switched into the receiving mode for a length of time necessary to capture the return pulse. Referring again to FIGS. 6-7, FIG. 6 shows the signal captured by the control unit when no person is in the pool and the return signal is reflected off the pool wall, and the control unit stores this signal as the reference signal. However, when a person enters the pool, the electronic signal of the transducer (108) would reflect off the person and walls of the pool, as shown in FIG.7. The device (700) analyzes the signals to determine a person intruding the pool, whereupon the device (700) will send a signal to an alarm system (701) to notify a user of the intrusion. The alarm system may be housed locally with the sensing device. Advantageously, the alarm system may be a remotely located alarm system, in which case the device may be wirelessly connected to the alarm system.

The device (700) can be configured to learn the physical characteristics of individual pools, e.g., the geometry of the pool and presence of structures such as ladders etc., by the returned signal which will be stored as the reference signal. The timer unit (105) of the digital processing unit (104) sends a timing signal to the driver (103) of the front end electronics system (102) at intervals regular or irregular to monitor the pool. By comparing the stored reference signal and the newly acquired signal, the control unit can detect intrusion in the pool.

As described above, the device (700) can differentiate a physical body intruding the pool from background signals such as rain drops penetrating the water surface by the returned signals. For example, when a person intrudes the pool, the sound waves are locally reflected. However, for rain drops, the sound waves are partially reflected along the whole volume of water. Therefore, the variation in the morphology and energy of the returned electronic signal of the transducer (108) discriminates between pool intrusion/occupancy level and rain drops.

In some embodiments, algorithms may be used to discriminate between pool intrusion/occupancy level and raindrops. The following a non-limiting example of such:

a. sound waves from rain drops may be concentrated towards the surface of the water in the pool, whereas sound waves from a person falling into the pool may be below the surface of the water; and b. raindrops and an intrusion of a person inside the pool have a different dynamic in terms of "event" duration and amplitude of sound waves.

In general, the electronic signal generated by the transducer coming from the rebound of ultrasonic waves may be dependent upon one or more of the following conditions:

a. geometry of the pool, for example, its dimensions, shape and structures such as ladder or ducts etc.;

b. geometry of the transducer(s), for example, its position and orientation etc.;

c. temperature of the water;

d. underwater currents due to a recirculation system; and e. environmental parameters such as wind, rain etc.

The above conditions can be varied between different pools, as each pool can have its own characteristic. However, one of the features of the present invention is the comparison of the signal between the reference signal and newly acquired signal (actual signal), whereby a threshold value between the compared data can be used to determine intrusion in a pool. The threshold value can differentiate a person intruding the pool from background noise/data derived from change in water conditions, such as change in temperature or underwater currents.

Figure 10:
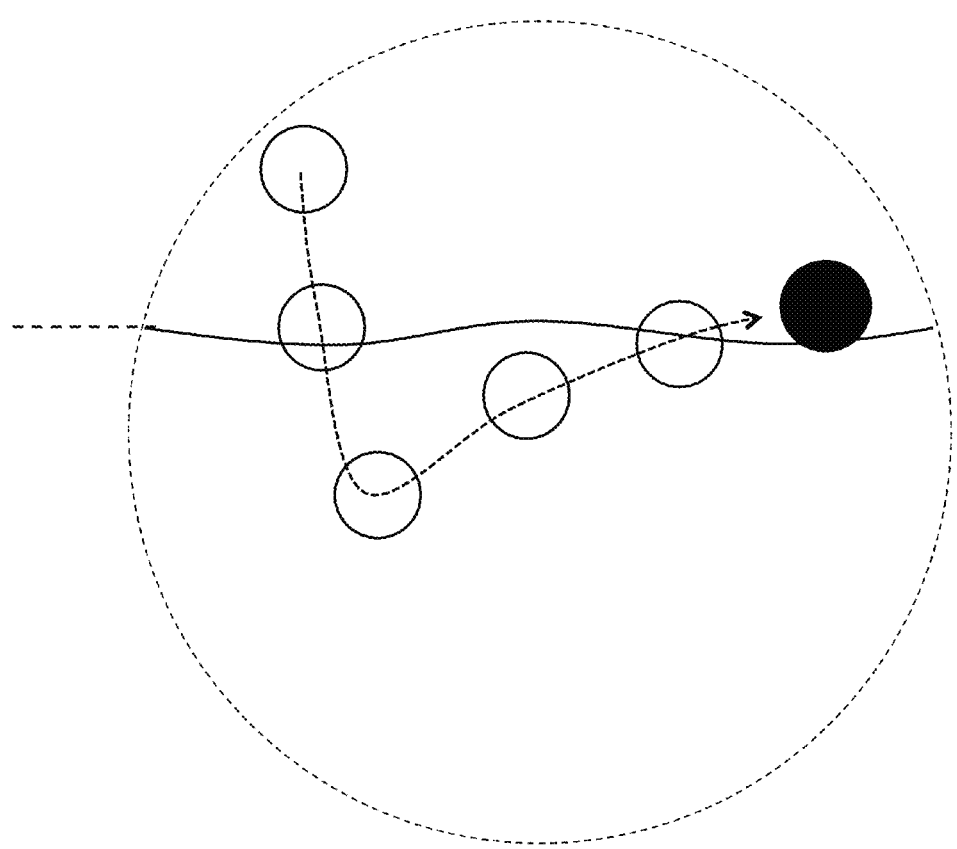
FIG. 10 shows a motion of an air-filled ball dropping into a swimming pool.
Figure 11:
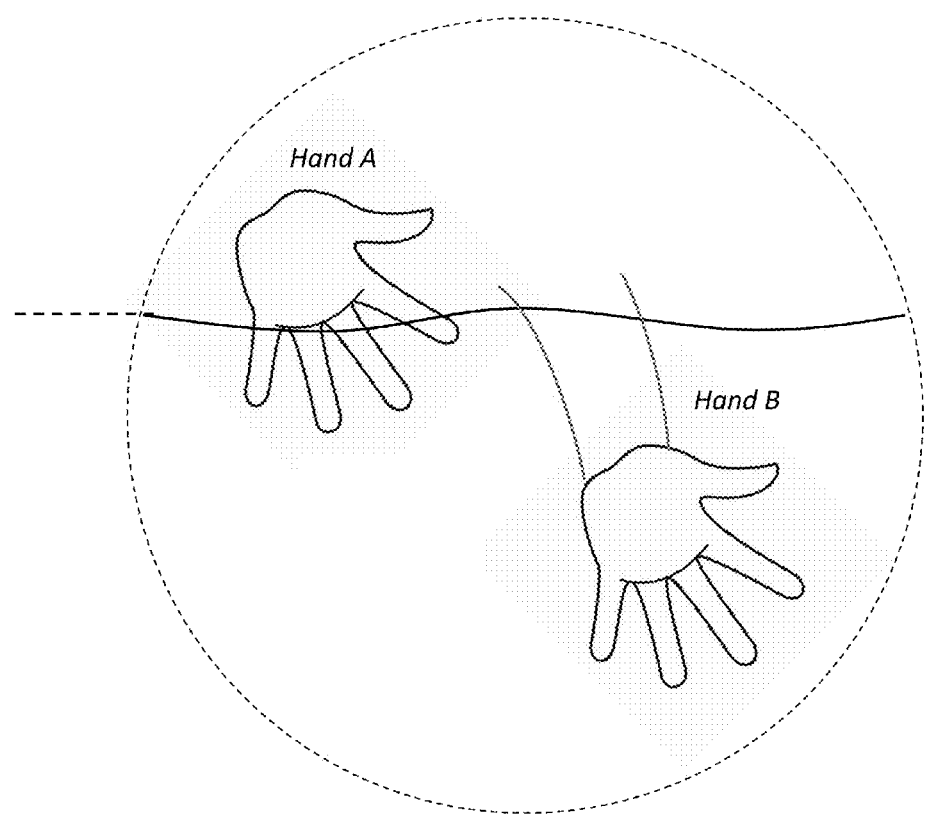
FIG. 11 shows Hand A touching the water and Hand B of a person falling into the swimming pool.

Advantageously, the present system recognizes temporary presence or elements of relatively low mass dropped in the swimming pool and is able to distinguish them from the intrusion of a child, man or animal. FIG. 10 shows an air-filled ball entering the water for less than 1-2 seconds and eventually floats to the surface. FIG. 11 shows the simulation of two hands: Hand A belongs to a person that checks the pool temperature while Hand B is the hand of a person losing his balance (and is about to enter into the swimming pool).

Figure 12:
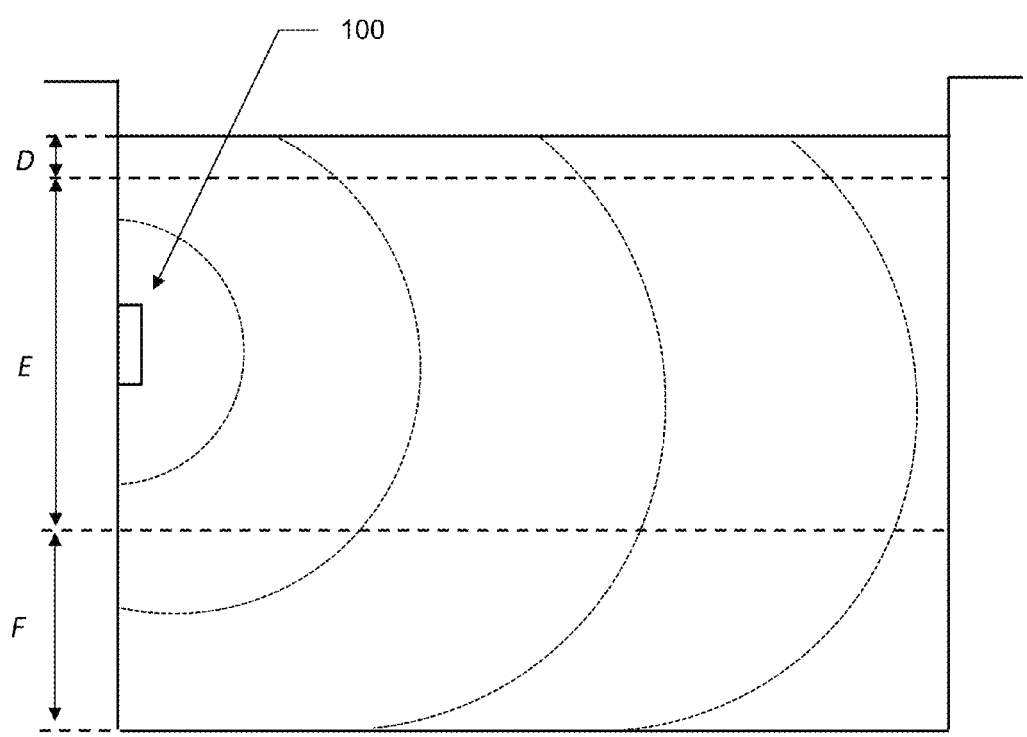
FIG. 12 shows a cross section of the swimming pool comprising the occupancy sensing device.

FIG. 12 shows a cross section of the swimming pool comprising the pool occupancy sensing device (100) in-situ, where the transducer (108) sends and receives ultrasonic pulses and echoes, respectively. As shown in FIG. 12, it can be envisaged that signals travel in the water, and the pool occupancy sensing device (100) may be configured to detect objects entering in layer E, the area of constant monitoring. Layer D is the superficial layer where signals may be filtered out due to background noise and/or interference caused by, for example, rain and waves. In such a case, the pool occupancy sensing device (100) avoids the false alarm. In contrast, as the object enters layer E, the pool occupancy sensing device (100) emits an alarm. The pool occupancy sensing device (100) may also filter out signals in layer F, so that the central processing unit (107) may be focused on signals in layer E; thus, improving the ability for the pool occupancy sensing device (100) to prioritize signal processing resources for evaluating signals in layer E. Advantageously, it can be envisaged that layers D, E, and F can be adjusted to suit, for example, areas of high winds. Moreover, the depth of layer D may be increased to reduce false alarms.

Figure 13:
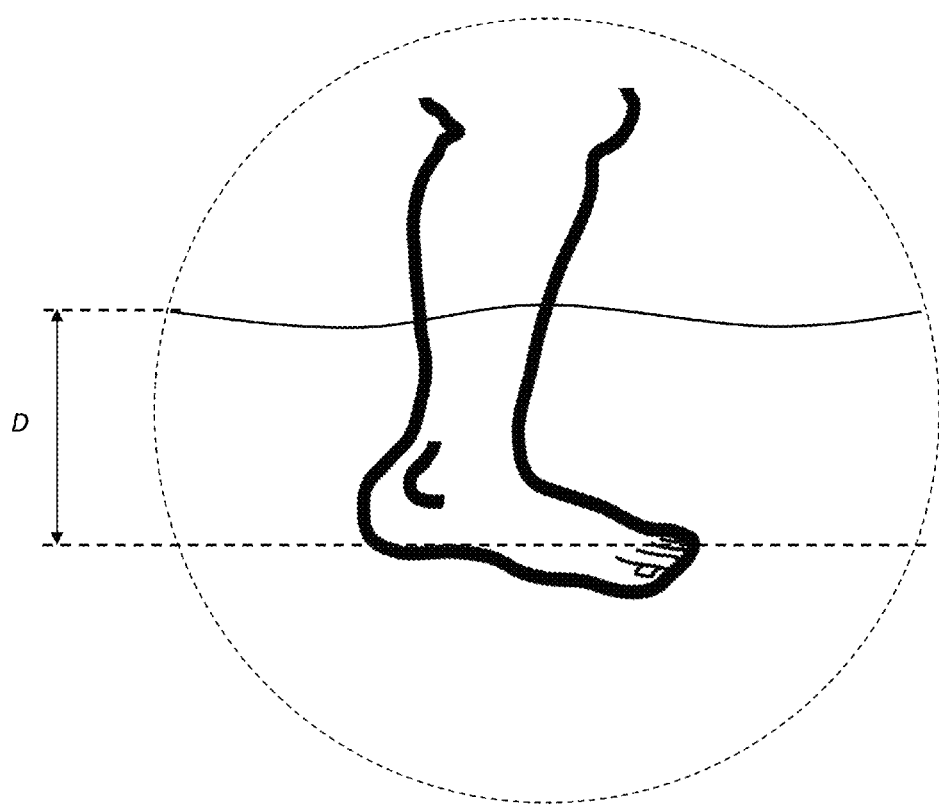
FIG. 13 shows a foot of a person penetrating a depth of the swimming pool.
Figure 14:
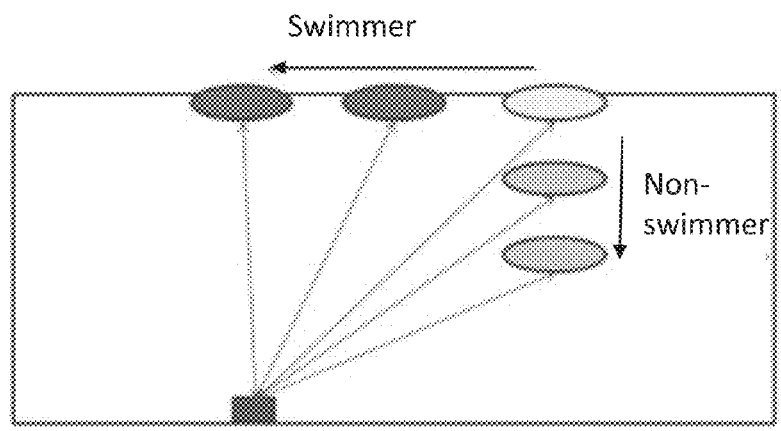
FIG. 14 shows a first diagrammatic representation of an embodiment of the Wolfe prior art.
Figure 15:
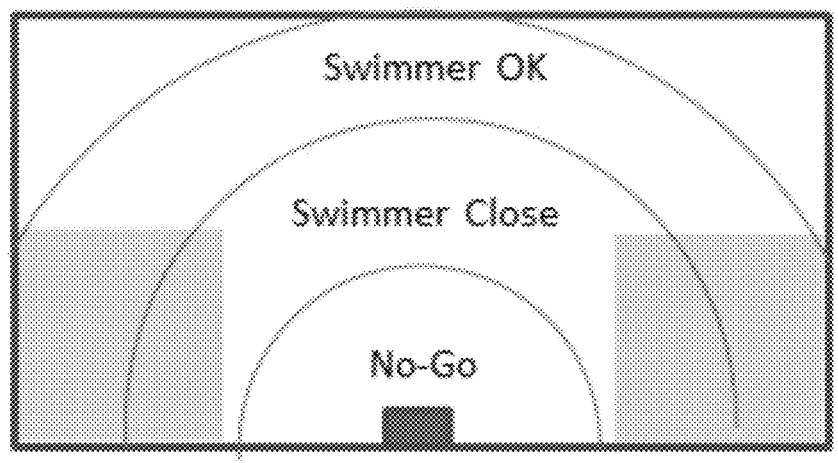
FIG. 15 shows a second diagrammatic representation of an embodiment of the Wolfe prior art.
Figure 16:
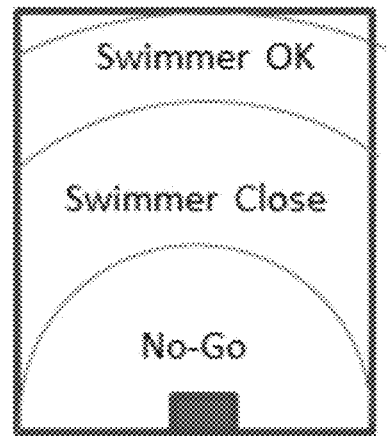
FIG. 16 shows a third diagrammatic representation of an embodiment of the Wolfe reference.

FIG. 13 represents the scenario of a person putting a foot in the pool and penetrating level D, where D is the depth of the intrusion. The device (100) can trigger the alarm just for the situation of Hand B of FIG. 11 and the foot of FIG. 13, where D can be set at an optimal value.

Figures 8, 9:
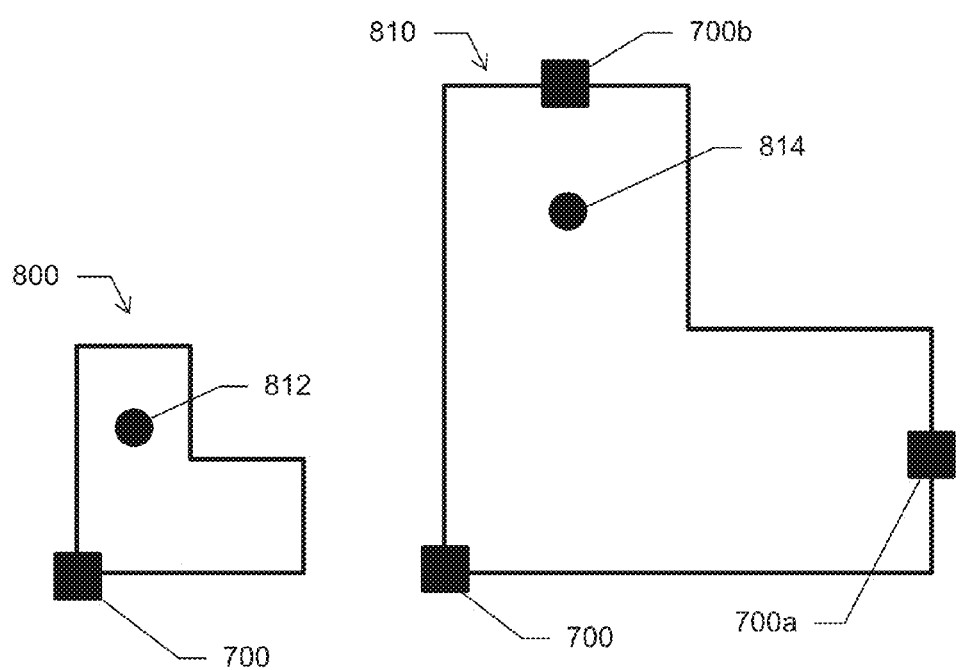
FIG. 8 shows a schematic plan view of a small pool with a person.
FIG. 9 shows a schematic plan view of a large pool with a person.

Due to a finite velocity of ultrasonic waves (i.e., that the speed of sound in water is 1482 m/s), in larger pools more than one device (700) may be used. FIG. 8 shows a single device (700) fitted in a smaller pool (800) to detect the intruder (812). FIG. 9 shows multiple devices (700, 700a, 700b) fitted in a larger pool (810) to detect the intruder (814). As shown in FIG. 9, the signal from the device (700) has to travel double the distance in comparison to the device (700) in FIG. 8. However, in a situation where potentially a child can fall into the pool, time is critical. Therefore, the larger pool (810), where the device (700b) is closer to the intruder (814), can provide an earlier alert/warning. Each device (700, 700a, 700b) may send the digital signal or its elaboration to a central unit (not shown). This central unit may communicate with all the devices and determine the status of the various areas (or "cells" of the matrix) of the swimming pool; using this information, the central unit can trigger an alarm indicative of a child falling into the pool. Advantageously, the positioning of multiple devices (700, 700a, 700b) may reduce blind spots to improve detection.

In a further embodiment, at least the central processing unit (107) and the digital processing unit (104) may be integrated (e.g., using a system on chip configuration) to form a master pool occupant sensing device. In this embodiment, one or more slave pool occupant sensing devices may be connected to the master pool occupant sensing device to determine the status of the various areas (or "cells" of the matrix) of the swimming pool. Each slave pool occupant sensing device may not require its discrete central processing unit.

Applications

Although the embodiments disclose the use of the device or system for swimming pool applications, it can be envisaged that the device or system can be used in detecting anomalies or a collection of articles in a water enclosure such as a school of fish, a pool cleaning or feeding system applications for fisheries, chemical dosing systems for chemical baths, food or beverage industries, fluid and refining processing and storage industries, or pool safety alarms etc. Advantageously, the device or system can be used in detecting foreign bodies or contaminants.

EMBODIMENTS

The following are non-limiting embodiments of the present invention, and are presented for purposes of illustration and description, and are not intended to limit the invention to the systems and/or devices disclosed herein.

Embodiment 1

According to an embodiment of the present invention, there is provided an ultrasonic pool occupant sensing device, capable of using ultrasonic pulses to analyze an occupancy level of a pool, said device comprising:
 a. an ultrasonic transducer, capable of sending and receiving ultrasonic pulses, wherein the transducer emits an ultrasonic pulse when activated by an electronic pulse, wherein the transducer generates an electronic signal when it receives an ultrasonic signal;
 b. a front end electronics system, operatively connected to the ultrasonic transducer, wherein the front end electronics system processes incoming and outgoing electronic signals from the transducer, comprising:
  i. a driver capable of sending the electronic pulse to the transducer;
  ii. a low-noise pre-amplifier, capable of receiving the electronic signal from the transducer;
  iii. a band-pass filter, operatively connected to the low-noise pre-amplifier, capable of filtering the electronic signal from the transducer; and
  iv. an amplifier, operatively connected to the band-pass filter, capable of amplifying the electronic signal received from the band-pass filter; and
 c. a digital processing unit comprising:
  i. a timer unit, configured to signal the driver to generate the electronic pulse at intervals;
  ii. an input/output unit, capable of sending and receiving data to and from the front end electronics system and the digital processing unit;
  iii. an analog-to-digital converter, configured to convert the electronic signal received from the transducer from analog to digital; and
  iv. a signal processor, configured to analyze the electronic signal and produce data concerning a number of occupants in the pool;
wherein the pool occupant sensing device is placed inside the pool, wherein the timer unit of the digital processing unit sends a timing signal to the driver of the front end electronics system, whereupon the driver generates the electronic pulse, whereupon the electronic pulse is transmitted to the transducer, whereupon the transducer emits the ultrasonic pulse which is transmitted into the pool at intervals, wherein said pulse is reflected off of the walls and occupants within the pool, whereupon the transducer receives an echo of the pulse, wherein the echo of the pulse is distorted by reflection from the various occupants and walls of the pool, wherein the transducer generates a received electronic signal, wherein said received signal is passed through the pre-amplifier, band-pass filter, and amplifier of the front end electronics system, wherein the received signal is transmitted to the digital processing unit, wherein the digital processing unit passes the received signal through the analog-to-digital converter to produce a digital signal, whereupon the signal processor generates data concerning the number of occupants in the pool, wherein the input/output unit permits said data to be transmitted to an external processor.

Embodiment 2

The device of Embodiment 1, wherein the signal processor compares data derived from the ultrasonic pulse transmitted into the pool at intervals to determine a change in the occupancy level.

Embodiment 3

The device of Embodiment 1, wherein the signal processor compares data derived from the ultrasonic pulse transmitted into the pool at intervals to determine a change in the number of occupants, wherein said comparison is based on a reference signal, which is continuously updated to reflect changes in physical elements of the pool that are unrelated to the number of occupants.

Embodiment 4

The device of any one of Embodiments 1 to 3, wherein the external processor is operatively connected to a visual display unit to display the number of occupants in the pool and/or the position of said occupants in the pool.

Embodiment 5

A pool occupancy level system comprising one or more ultrasonic pool occupant sensing devices of Embodiment 2 or 3, wherein the external processor collects data from each pool occupant sensing device, whereupon the external processor generates an aggregate estimate of the number of occupants in the pool.

Embodiment 6

The system of Embodiment 5, wherein the external processor is a central processing unit.

Embodiment 7

The system of Embodiment 6 further comprising a pool water circulation control system, capable of adjusting a rate at which water is pumped through the pool and an amount of additives added, operatively connected to the central processing unit, whereupon the central processing unit collects data from each ultrasonic pool occupant sensing device, whereupon the central processing unit generates the aggregate estimate of the number of occupants in the pool, whereupon the central processing unit controls the pool water circulation system to adjust the amount of additives added and the rate at which water is pumped, via the pool water circulation control system, according to the aggregate estimate of the number of occupants in the pool.

Embodiment 8

The system of Embodiment 7, wherein the one or more pool occupant sensing devices are arranged to form a grid across the pool, wherein the central processing unit determines a count of occupants in each section of the grid, wherein the central processing unit regulates said adjustment of the amount of additives added and the rate at which water is pumped for each section individually based on each count, via the water circulation system.

Embodiment 9

The system of Embodiment 7 or 8, wherein said additives comprise cleaning chemicals or solutions.

Embodiment 10

The system of Embodiment 7 or 8, comprising a plurality of pool occupant sensing devices, wherein the plurality of pool occupant sensing devices communicates data and commands between them exploiting ultrasound waves travelling into water.

Embodiment 11

The system of any one of Embodiments 5 to 10, when used in a pool for human occupancy.

Embodiment 12

The system of any one of Embodiments 7 to 8 or 10, where the additives comprise feed.

Embodiment 13

The system of any one of Embodiments 5 to 10 or 12, when used in a fishery or in an aqua-cultural farm.

Embodiment 14

The system of any one of Embodiments 5 to 10 or 12, when used in a food or beverage industries.

Embodiment 15

The system of any one of Embodiments 5 to 10 or 12, when used in fluid processing or refining industries.

Embodiment 16

The system of any one of Embodiments 5 to 10 or 12, when used in storage industries.

Embodiment 17

According to another embodiment of the present invention, there is provided an ultrasonic pool occupant sensing device, capable of using ultrasonic pulses to analyze an intrusion in a pool, comprising:
  a. an ultrasonic transducer, capable of sending and receiving ultrasonic pulses, wherein said transducer emits an ultrasonic pulse when activated by an electronic pulse, wherein the transducer generates an electronic signal when it receives an ultrasonic signal;
  b. a front end electronics system, operatively connected to the ultrasonic transducer, wherein the front end electronics system processes incoming and outgoing electronic signals from the transducer, comprising:
    i. a driver capable of sending the electronic pulse to the transducer;
    ii. a low-noise pre-amplifier, capable of receiving the electronic signal from the transducer;
    iii. a band-pass filter, operatively connected to the low-noise pre-amplifier, capable of filtering the electronic signal from the transducer; and
    iv. an amplifier, operatively connected to the band-pass filter, capable of amplifying the electronic signal received from the band-pass filter; and
  c. a digital processing unit comprising:
    i. a timer unit, configured to signal the driver to generate the electronic pulse at intervals;
    ii. an input/output unit, capable of sending and receiving data to and from the front-end electronics system and the digital processing unit;
    iii. an analog-to-digital converter, configured to convert the electronic signal received from the transducer from analog to digital; and
    iv. a signal processor, configured to analyze the received digital signal and produce data concerning a number of people in the pool;
  wherein the pool occupant sensing device is placed inside the pool, wherein the timer unit of the digital processing unit sends a timing signal to the driver of the front end electronics system, whereupon the driver generates the electronic pulse, whereupon the electronic pulse is transmitted to the transducer,
  whereupon the transducer emits an ultrasonic pulse which is transmitted into the pool at intervals, wherein said pulse is reflected off the walls and intrusion within the pool, whereupon the transducer receives an echo of the pulse, wherein the echo of the pulse is distorted by reflection from the intrusion and walls of the pool, wherein the transducer generates a received electronic signal, wherein said received signal is passed through the low-noise pre-amplifier, band-pass filter, and amplifier in the front end electronics system, wherein the received signal is transmitted to the digital processing unit, wherein the digital processing unit passes the received signal through the analog-to-digital converter to produce a digital signal, whereupon the signal processor generates data concerning the presence of the intrusion in the pool, wherein the input/output unit permits said data to be transmitted to an alarm system.

Embodiment 18

The device of Embodiment 17, wherein the signal processor compares data derived from the ultrasonic pulse transmitted into the pool at intervals to determine a change in status of the pool, wherein said comparison is based on a reference signal, which is continuously updated to reflect changes in physical elements of the pool that are unrelated to the number of occupants.

Embodiment 19

The device of Embodiment 18, wherein the change in status of the pool is a change in status of the intrusion into the pool.

Embodiment 20

The device of any one of Embodiments 17 to 19, wherein data is transmitted to a visual display unit to display a position of the intrusion in the pool.

Embodiment 21

The device of any one of Embodiments 17 to 19, wherein the alarm system is a remotely located alarm system.

Embodiment 22

The device of Embodiment 21, wherein data is transmitted to the remotely located alarm system wirelessly.

Embodiment 23

The device of any one of Embodiments 17 to 22, when used in a pool for human occupancy.

Embodiment 24

The device Embodiment 1, wherein the signal processor (113) compares the newly acquired data derived from the ultrasonic pulse transmitted into the pool against a reference signal, that is continuously updated to keep into account the changes occurring into the swimming pool caused by the physical quantities not related to the presence of an occupant, to determine a change in the number of occupants.

Embodiment 25

A pool intrusion system comprising one or more ultrasonic pool occupant sensing devices of any one of Embodiments 17 to 24.

Embodiment 26

The system of Embodiment 25, wherein the pool occupant sensing devices communicate data and commands between them wirelessly.

Embodiment 27

The system of Embodiment 26, wherein the pool occupant sensing devices communicate data and commands between them exploiting ultrasound waves travelling into water.

Embodiment 28

According to another embodiment of the present invention, there is provided a pool-water regulation system, based on sonar detection of a number of occupants in a pool, comprising:
 a. a central processing unit:
 b. at least one ultrasonic pool occupant sensing device, operatively connected to the central processing unit, disposed inside a pool; and
 c. a pool water circulation control system, capable of adjusting the rate at which water is pumped through the pool and the amount of additives added, operatively connected to the central processing unit;
whereupon the central processing unit collects data from each ultrasonic pool occupant sensing device, whereupon the central processing unit generates an aggregate estimate of the total number of occupants in the pool, whereupon the central processing unit controls the pool water circulation system to adjust the additive dispensation and pump rate of the circulation system according to the number of occupants in the pool.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. An ultrasonic pool occupant sensing device (100), capable of using ultrasonic pulses to analyze an occupancy level of a pool, comprising:
 a. an ultrasonic transducer (108), capable of sending and receiving ultrasonic pulses, wherein said transducer (108) emits an ultrasonic pulse when activated by an electronic pulse, wherein the transducer (108) generates an electronic signal when it receives an ultrasonic signal;
b. a front end electronics system (102), operatively connected to the transducer (108), wherein the front end electronics system (102) processes incoming and outgoing electronic signals from the transducer (108), wherein the front end electronics system (102) comprises:
   i. a driver (103) capable of sending the electronic pulse to the transducer (108);
   ii. a low-noise pre-amplifier (109) capable of receiving the electronic signal from the transducer (108);
   iii. a band-pass filter (110), operatively connected to the pre-amplifier, capable of filtering the electronic signal from the transducer (108); and
   iv. an amplifier (111), operatively connected to the band-pass filter (110), capable of amplifying the electronic signal received from the band-pass filter (110); and
c. a digital processing unit (104) comprising:
   i. a timer unit (105) configured to signal the driver (103) to generate the electronic pulse at intervals;
   ii. an input/output unit (106) capable of sending and receiving data to and from the front-end electronics system and the digital processing unit (104);
   iii. an analog-to-digital converter (112) configured to convert the electronic signal received from the transducer (108) from analog to digital; and
   iv. a signal processor (113) configured to analyze the electronic signal and produce data concerning a number of occupants in the pool;
wherein the pool occupant sensing device (100) is placed inside the pool, wherein the timer unit (105) of the digital processing unit sends a timing signal to the driver (103) of the front end electronics system (102), whereupon the driver (103) generates the electronic pulse, whereupon the electronic pulse is transmitted to the transducer (108),
whereupon the transducer (108) emits the ultrasonic pulse which is transmitted into the pool at intervals, wherein said pulse is reflected off of the walls and occupants within the pool, whereupon the transducer (108) receives an echo of the pulse, wherein the echo of the pulse is distorted by reflection from various pool occupants and walls of the pool, wherein the transducer (108) generates a received electronic signal,
wherein said received signal is passed through the low-noise pre-amplifier (109), band-pass filter (110), and amplifier (111) of the front end electronics system (102), wherein the received signal is transmitted to the digital processing unit (104), wherein the digital processing unit (104) passes the received signal through the analog-to-digital converter (112) to produce a digital signal, whereupon the signal processor (113) generates data concerning the number of occupants in the pool, wherein the input/output unit (106) permits said data to be transmitted to an external processor.

2. The device (100) of claim 1, wherein the signal processor (113) compares data derived from the ultrasonic pulse transmitted into the pool at intervals to determine a change in the number of occupants, wherein said comparison is based on a reference signal, which is continuously updated to reflect changes in physical elements of the pool that are unrelated to the number of occupants.

3. The device (100) of claim 2, wherein the external processor is operatively connected to a visual display unit to display the number of occupants in the pool or a position of said occupants in the pool.

4. A pool occupancy level system comprising one or more ultrasonic pool occupant sensing devices (100) of claim 2, wherein the external processor collects data from each pool occupant sensing device (100), whereupon the external processor generates an aggregate estimate of the number of occupants in the pool.

5. The system of claim 4, wherein the external processor is a central processing unit (107).

6. The system of claim 5 further comprising a pool water circulation control system, capable of adjusting a rate at which water is pumped through the pool and an amount of additives added, operatively connected to the central processing unit (107),
whereupon the central processing unit (107) collects data from each ultrasonic pool occupant sensing device (100), whereupon the central processing unit (107) generates the aggregate estimate of the number of occupants in the pool, whereupon the central processing unit (107) controls the pool water circulation system to adjust the amount of additives added and the rate at which water is pumped, via the pool water circulation control system, according to the aggregate estimate of the number of occupants in the pool.

7. The system of claim 6, wherein the one or more pool occupant sensing devices (100) are arranged to form a grid across the pool, wherein the central processing unit (107) determines a count of occupants in each section of the grid, wherein the central processing unit (107) regulates said adjustment of the amount of additives added and the rate at which water is pumped for each section individually based on each count, via the water circulation system.

8. The system of claim 6, wherein said additives comprise cleaning chemicals or solutions.

9. The system of claim 6, where said additives comprise feed.

10. The system of claim 4, comprising a plurality of pool occupant sensing devices (100), wherein the plurality of pool occupant sensing devices (100) communicates data and commands between them exploiting ultrasound waves travelling into water.

11. An ultrasonic pool occupant sensing device (100), capable of using ultrasonic pulses to analyze an intrusion in a pool, comprising:
a. an ultrasonic transducer (108), capable of sending and receiving ultrasonic pulses, wherein said transducer (108) emits an ultrasonic pulse when activated by an electronic pulse, wherein the transducer (108) generates an electronic signal when it receives an ultrasonic signal;
b. a front end electronics system (102), operatively connected to the transducer (108), wherein the front end electronics system (102) processes incoming and outgoing electronic signals from the transducer (108), the front end electronics system (102) comprising:
   i. a driver (103) capable of sending the electronic pulse to the transducer (108);
   ii. a low-noise pre-amplifier (109) capable of receiving the electronic signal from the transducer (108);
   iii. a band-pass filter (110), operatively connected to the pre-amplifier, capable of filtering the electronic signal from the transducer (108); and iv. an amplifier (111), operatively connected to the band-pass filter (110), capable of amplifying the electronic signal received from the band-pass filter (110); and c. a digital processing unit (104) comprising:
   i. a timer unit (105) configured to signal the driver (103) to generate the electronic pulse at intervals;
   ii. an input/output unit (106) capable of sending and receiving data to and from the front end electronics system and the digital processing unit (104);
   iii. an analog-to-digital converter (112) configured to convert the electronic signal received from the transducer (108) from analog to digital; and
   iv. a signal processor (113) configured to analyze the received digital signal and produce data concerning a number of people in the range of the transducer (108);

wherein the pool occupant sensing device (100) is placed inside the pool, wherein the timer unit (105) of the digital processing unit sends a timing signal to the driver (103) of the front end electronics system (102), whereupon the driver (103) generates the electronic pulse, whereupon the electronic pulse is transmitted to the transducer (108), whereupon the transducer (108) emits the ultrasonic pulse which is transmitted into the pool at intervals, wherein said pulse is reflected off the walls and intrusion within the pool, whereupon the transducer (108) receives an echo of the pulse, wherein the echo of the pulse is distorted by reflection from the intrusion and walls of the pool, wherein the transducer (108) generates a received electronic signal, wherein said received signal is passed through the low-noise pre-amplifier(109), band-pass filter (110), and amplifier (111) in the front end electronics system (102), wherein the received signal is transmitted to the digital processing unit (104), wherein the digital processing (104) unit passes the received signal through the analog-to-digital converter (112) to produce a digital signal, whereupon the signal processor (113) generates data concerning the presence of the intrusion in the pool, wherein the input/output unit (106) permits said data to be transmitted to an alarm system.

12. The device (100) of claim 11, wherein the signal processor (113) compares data derived from the ultrasonic pulse transmitted into the pool at intervals to determine a change in status of the pool, wherein said comparison is based on a reference signal, which is continuously updated to reflect changes in physical elements of the pool that are unrelated to the number of occupants.

13. The device (100) of claim 12, wherein the change in status of the pool is a change in status of the intrusion into the pool.

14. The device (100) of claim 12, wherein data is transmitted to a visual display unit to display a position of the intrusion in the pool.

15. The device (100) of claim 12, wherein the alarm system is a remotely located alarm system.

16. The device (100) of claim 15, wherein data is transmitted to the remotely located alarm system wirelessly.

17. A pool intrusion system comprising one or more of the ultrasonic pool occupant sensing devices (100) of claim 12.

18. The system of claim 17, wherein the one or more pool occupant sensing devices (100) communicates data and commands between them wirelessly.

19. The system of claim 18, wherein the one or more pool occupant sensing devices (100) communicate data and commands between them exploiting ultrasound waves travelling into water.

\* \* \* \* \*